April 30, 1963 M. PACAK 3,087,531
APPARATUS FOR MAKING GROOVED WHEELS
Filed Nov. 23, 1959 6 Sheets-Sheet 2

FIG. 2

INVENTOR.
MATTHEW PACAK
BY Hudson, Boughton,
Williams, David & Hoffmann
ATTORNEYS

INVENTOR.
MATTHEW PACAK
BY Hudson, Boughton,
Williams, David & Hoffmann
ATTORNEYS

FIG. 4

INVENTOR.
MATTHEW PACAK
BY
ATTORNEYS

April 30, 1963 M. PACAK 3,087,531
APPARATUS FOR MAKING GROOVED WHEELS
Filed Nov. 23, 1959 6 Sheets-Sheet 6

INVENTOR.
MATTHEW PACAK
BY Hudson, Boughton,
Williams, David & Hoffmann
ATTORNEYS

United States Patent Office 3,087,531
Patented Apr. 30, 1963

3,087,531
APPARATUS FOR MAKING GROOVED WHEELS
Matthew Pacak, Solon, Ohio, assignor to Eaton Manufacturing Company, Cleveland, Ohio, a corporation of Ohio
Filed Nov. 23, 1959, Ser. No. 854,957
7 Claims. (Cl. 153—2)

This invention relates to the manufacture of peripherally grooved members, such as peripherally grooved wheels, pulleys, sheaves and other wheel-like members by a blank-splitting procedure, and which grooved members are hereinafter referred to merely as grooved wheels.

Various problems are encountered in attempting to produce grooved wheels by such a blank-splitting procedure using a penetrating roller as the splitting tool. One problem has to do with the manner of engaging the splitting tool with the blank so as to avoid damage thereto by tearing or bending, as well as by a harmful run-off of the tool from the blank edge engaged thereby. In the apparatus of this invention this problem is successfully met by providing for a slow-feed touch engagement of the tool edge with the blank followed by a more rapid feed for penetrating the tool into the blank, and by providing for a proper alignment of the tool edge relative to the blank.

Another problem concerns the matter of tool life for the splitting tool and the rate of penetration of the splitting tool into the blank. If the splitting tool has an annular edge portion which is relatively thin or sharp by reason of its having a small or very acute included angle, the tool will penetrate rapidly but will have only a short life because of the greater vulnerability to dulling. Rapid dulling of the splitting tool is a serious disadvantage because the need for frequent tool replacement interrupts the production operation of the machine, and moreover, a dull condition of the splitting tool of itself slows production output and results in a poor quality of product.

On the other hand, if the edge portion of the splitting tool is relatively thick or blunt by reason of its included angle being less acute, a longer tool life will be achieved but blank penetration and work output will be slower and the tendency for tool run-off will be greater. In the present invention this problem of tool life and rate of blank penetration is successfully met by the use of a splitting tool having an edge characteristic particularly suitable for the character of the operation being performed.

In referring herein to the edge portion of the splitting tool as being either sharp or blunt, it should be understood that these terms are being used to describe or compare the acuteness of the convergent side faces of such edge portion and do not refer to any particular condition of sharpness of the extreme apex or knife-edge located precisely at the junction or intersection of the convergent side face. The sharpness of the knife-edge or extreme apex concerns the apparatus of this invention only in relation to the acuteness, that is, the thinness or thickness of the edge portion immediately adjacent the knife-edge. This is true because, even if such a knife-edge of an extremely sharp character is initially provided on the splitting tool, it will necessarily become dulled by rounding or flattening thereof against the workpiece during the very first, or first few, splitting operations carried out whereas the angle of convergence of the side faces of the edge portion of the splitting tool will remain substantially unchanged.

Therefore, it will be recognized that a splitting tool having a relatively sharp edge portion, as contemplated by this invention, is one whose convergent edge portion immediately adjacent the knife-edge is relatively thin or more acute, and a splitting tool having a blunt edge portion is one whose convergent edge portion immediately adjacent the knife-edge is thicker or relatively less acute. The radial length of the convergently tapered portion or portions supporting the knife-edge can, of course, be varied as desired and will depend largely on the cross-sectional shape and axial thickness of the portion or portions of the splitting tool which connect the convergent portion or portions with the hub of the tool.

Having in mind these and other problems this invention provides, as one of its objects, a novel apparatus by which grooved wheels can be produced rapidly and economically by a splitting procedure and with a desired quality and uniformity in the articles produced.

Another object is to provide a novel apparatus for producing grooved wheels and involving the use of sharp-edged and blunt-edged tools, preferably rollers, and the application of such tools in succession to the edge portion of a blank for splitting the edge portion and then shaping the split portion into a rim.

Still another object is to provide novel grooved wheel making apparatus having such rollers and means for actuating the same, as well as adjusting means for adjustably positioning the rollers for proper co-operation with a blank held in a workholder means.

A further object is to provide a novel grooved wheel making apparatus of the character referred to above wherein the workholder means comprises co-operating holder members having bevel portions defining a work groove into which the edge portion of the blank projects, and wherein the tools co-operate with the blank and with such holder members for splitting and shaping the edge portion of the blank into a wheel rim of the desired form.

Additionally, this invention provides a novel grooved wheel making apparatus of the character referred to above and wherein the splitting tool is a roller having a sharp annular edge portion defined by an included angle of approximately 60 degrees and which affords a rapid rate of blank penetration in combination with good tool life and a resulting high quality of product.

Other objects and advantages of this invention will be apparent in the following detailed description and in the accompanying drawings forming a part of this specification and in which.

The apparatus of this invention involves the use of splitting and forming tool means for producing peripherally grooved wheels by engaging the tool means with the edge portion of a metal blank so as to split and form such edge portion into a grooved rim. The tool means is here shown as comprising rollers 10 and 11, which are successively brought into operative engagement with the edge portion or periphery 12 of a disk-shaped metal blank 13 for splitting such edge portion and shaping the same into a grooved rim, while the blank is being held and rotated by a workholder means 14.

The splitting and forming rollers 10 and 11 and the workholder means 14 are here represented as being components of a wheel making apparatus or machine 16 which is shown in FIGS. 1 to 6 inclusive and described in detail hereinafter. In the machine 16 the workholder means 14 is located between a pair of tool carrying heads 17 and 18 which support the splitting and forming rollers 10 and 11 so that these rollers are movable into engagement with the edge portion 12 of the blank 13 from opposite sides of the rotation axis of the workholder means.

The workholder means 14 and the splitting and forming rollers 10 and 11, as well as the co-operation of these components with the blank 13, will be described in a general way at this point by reference to FIGS. 7 to 13 inclusive. The blank 13 is shown, by way of example, as being a disk-like sheet metal stamping having a cup-shaped central hub 20 provided with an opening 21 and a flat circular plate portion 22 connected with the hub in a radially projecting relation thereto and terminating in the flat annular edge portion 12. The edge portion 12 presents a radially outwardly facing circular edge wall 23 of an axial dimension corresponding with the thickness of this portion of the blank.

The blank 13 can be of any sheet stock suitable for the splitting procedure disclosed herein and is of a thickness having a suitable relation to the diameter of the blank. The sheet stock is preferably one which will have a desired uniformity as to the hardness and grain structure of the edge portion 12, so as to facilitate the splitting procedure and the accuracy thereof. If the blank 13, or the sheet stock from which it is obtained, does not initially have the hardness and grain structure characteristics needed for a good splitting action, it can be suitably treated as by annealing, heat-treating or other such steps to acquire the needed characteristics.

Although the blank 13 is shown as being a one-piece stamping it may, if desired, be a well-known form of wheel structure comprising a hub member and a disk member suitably connected to such hub member.

Figure 13:
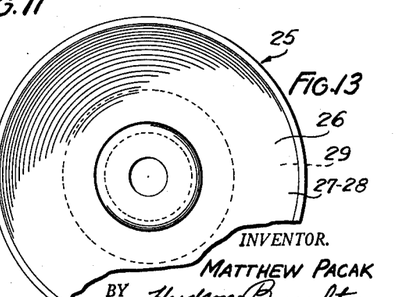
FIG. 13 is a partial plan view of the completed article.

FIG. 13 shows a completed article 25, in this case a grooved wheel having the form of a pulley, which has been produced from the blank 13 by the apparatus of this invention and which is of a circular form having an annular rim portion 26 defined by a pair of spaced annular flanges or divergent walls 27 and 28 (see FIG. 11) separated by an intervening V-shaped annular groove 29 for receiving a belt or the like. The rim portion 26 is formed by splitting and shaping the annular rim portion 12 of the blank 13 by the apparatus of this invention, as will be developed hereinafter. The outer peripheral or free edges of the divergent walls 27 and 28 extend in an axially oppositely deflected relation as annular beads 31 and 32 formed on these walls. The bottom of the V-shaped annular groove 29 preferably has the form of a transversely concave annular fillet portion 33 which merges with, and smoothly joins, the adjacent surfaces of the divergent side walls 27 and 28.

Figure 7:
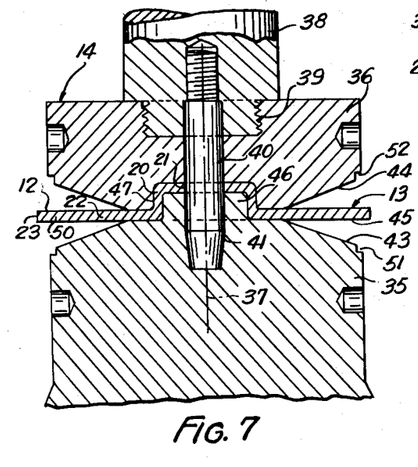
FIG. 7 is a partial vertical axial section taken through the workholder means as indicated by section line 7—7 of FIG. 2 and showing the blank prior to splitting thereof.

The workholder means 14 comprises co-operating workholder members 35 and 36 which are rotatable about a common axis 37 and of which the lower workholder member 35 is an anvil member and the upper workholder member 36 is a clamping member for clamping the blank 13 against the anvil member, as shown in FIG. 7. The clamping member 36 is movable toward and away from the anvil member 35 for clamping or releasing the blank 13, as by means of a reciprocably movable actuating rod 38 to which the clamping member is attached by a threaded connection 39. The workholder means 14 also includes a pilot pin 40 extending through, and projecting from, the clamping member 36 and which is movable into a socket 41 of the anvil member 35 by passage through the opening 21 of the blank.

The workholder members 35 and 36 are provided with annular bevel surfaces 43 and 44 on their adjacent ends which co-operate to define an inwardly converging annular work groove 45 having an included angle corresponding substantially with the angle of divergence of the pulley rim walls 27 and 28. The anvil member 35 is here shown as having a central axial stem portion or boss 46 which enters the recess of the cup-shaped hub portion 20 of the blank 13 and the clamping member 36 is provided with a cup-shaped mating central axial recess 47 for receiving the hub of the blank, so that the co-operation of these portions of the workholder members with the blank will result in the blank being securely held therebetween with the flat annular edge portion 12 projecting radially into or through the work groove 45.

When the blank 13 has been clamped in the workholder means 14 in the relation just described above the mid-plane 50 of the flat plate portion 22 of the blank will be substantially coincident with the transverse mid-plane of the annular work groove 45 which is also the parting plane between the workholder members 35 and 36. The workholder members 35 and 36 are also provided at the outer edges of the bevel surfaces 43 and 44 with annular recesses or notches 51 and 52 to which further reference will be made in connection with the description of the formation of the beads 31 and 32 on the rim portion 26 of the wheel 25 being produced.

The splitting tool 10 is here shown as being a roller of an appropriate size in relation to the dimensions of the blank 13 on which it is to operate and having a hub portion 53 by which this tool can be rotatably mounted on a suitable shaft or arbor 54ᵃ (see FIGS. 1, 4 and 5) forming a part of the machine 16. The splitting roller 10 is here shown as having an annular ridge portion 55 converging outwardly toward and merging with an annular edge portion 56 which terminates in and supports an annular apex or knife-edge 57. The portion of the roller 10 which connects the annular ridge portion 55 with the hub 53 is here shown as being an annular radial portion 58 having parallel annular sides 58ᵃ and 58ᵇ. The included angle between the convergent side faces 55ᵃ and 55ᵇ of the ridge portion 55 is of a suitable value corresponding substantially with the included angle of the V-shaped groove 29 of the wheel 25 to be produced. The groove 29 of the wheel 25 is here shown as having an included angle of 37 degrees but the included angle of this groove could be of any desired value between, say, 30 degrees and 90 degrees. The splitting roller 10 is made of suitable material such as hardened tool steel.

It has already been indicated above in a general way that the included angle of the convergent annular edge portion 56 which is immediately adjacent the knife-edge 57 of the splitting roller 10 is an important characteristic because, if this edge portion is relatively thin, that is, defined by a very small included angle, it will be subject to rapid dulling, and consequently, the tool will have a short life and will need frequent replacement which will mean frequent interruptions in the production operation of the machine 16. On the other hand, if the convergent annular edge portion 56 is less sharp by reason of its being thicker, that is, having an included angle of a relatively large value, the tool will have a greater useful life but will penetrate the blank more slowly and will also be subject to a greater tendency for run-off of the tool from the edge portion of the blank.

Figure 10:
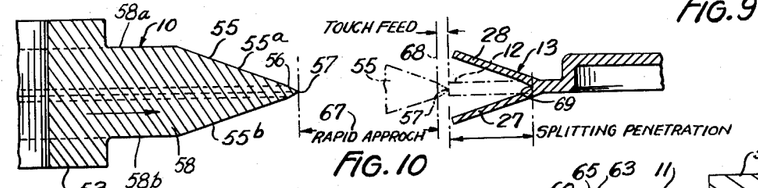
FIG. 10 is a vertical axial section of a somewhat diagrammatic form showing the shape of the splitting tool and further illustrating the splitting operation.

The present invention contemplates the use of a thinly tapered annular splitting edge portion 56 on the roller 10, that is, a convergent or V-shaped annular edge portion immediately adjacent the knife-edge 57 and which is defined by an included angle not materially greater than, say, 75 degrees. A splitting edge portion of this sharpness, that is, a convergent or V-shaped annular edge portion having an included angle of a value from 30 degrees to 75 degrees, will provide a relatively rapid penetration rate with a good tool life and will also operate satisfactorily in contacting or marking the edge of the blank during feeding engagement therewith with very little tendency to tear or deflect the blank or to have any marked run-off tendency. The ridge portion 55 and the sharp annular edge portion 56 of the splitting roller 10 are symmetrical in cross-sectional shape, as shown in FIG. 10, with the knife-edge 57 lying in the radial mid-plane of the roller.

Figure 11:
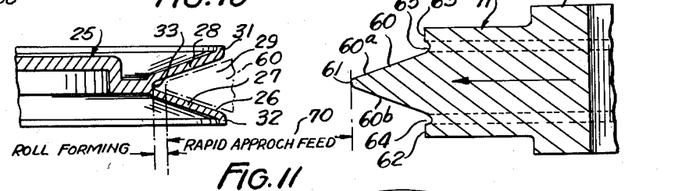
FIG. 11 is another vertical axial section of a diagrammatic form showing the shape of the forming roller and further illustrating the shaping of the split blank to wheel rim form.
Figure 12:
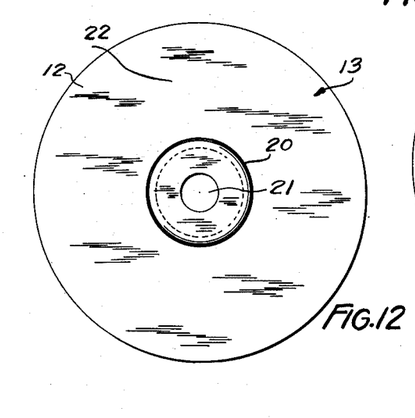
FIG. 12 is a plan view of the blank.

The forming tool 11 is shown in FIG. 11 as being a roller having a hub portion 59, by which this roller can be rotatably mounted on a suitable shaft or arbor such as the shaft or arbor 54$^b$ of the machine 16 (see FIG. 1), and carries an outwardly convergent annular ridge portion 60 terminating in a blunt or transversely convex peripheral edge 61. The annular ridge portion 60 is substantially V-shaped and constructed so that the included angle between the side faces 60$^a$ and 60$^b$ thereof will correspond substantially with the included angle of the annular groove 29 desired in the completed wheel 25 and which, in this case, is an included angle of approximately 37 degrees as mentioned above. The transverse curvature of the apex of the blunt or convex peripheral edge 61 is substantially the same as the transverse shape of the filleted portion 33 of the completed wheel 25.

The forming roller 11 is provided with radially facing annular shoulders 62 and 63 on opposite sides of the ridge portion 60 and with annular bead forming grooves 64 and 65 recessed into these shoulders and merging smoothly with the side faces 60$^a$ and 60$^b$ of the ridge portion adjacent the base of the latter. The roller 11 is made of a suitable material such as hardened tool steel.

In the performance of the splitting procedure of this invention the blank 13 is clamped in the workholder means 14 in the relation shown in FIG. 7 and described above, and the splitting roller 10 is advanced toward the peripheral edge face 23 of the blank with the knife-edge 57 of the roller lying in or centered on the mid-plane 50 of the blank. The feeding movement of the roller 10 toward the blank 13 is carried out with an initial rapid approach movement, represented for example by the dimensional distance 67 indicated in FIG. 10, and brings the knife-edge 57 to the position represented by the line 68, that is, at or about a distance comprising a fraction of an inch, say, approximately one-eighth of an inch, from the edge face 23 of the blank.

The rapid approach feeding movement of the splitting roller 10 can be at any suitable fast rate, but the movement of the tool to advance the knife-edge 57 from the position represented by the line 68 into a touch engagement or marking contact with the edge face 23 of the blank should be at a relatively slow rate of feed. The rate of feed for this touch engagement can be reasonably varied and will depend to an appreciable extent upon the dimensions and characteristics of the blank 13 and of the splitting tool 10. For some blank materials and dimensions touch feed movements of from three to ten inches per minute are appropriate and have been used with the apparatus hereof. Such an appropriate slow touch feed movement of the knife edge 57 into engagement with the blank 13 will cause the edge face 23 of the blank to be marked therearound on the mid-plane 50 with little or no run-off tendency of the tool and with little or no likelihood of the blank being torn or deflected.

As soon as the knife-edge 57 has been brought into such a marking engagement with the edge face 23 of the blank 13 by the slow touch feed movement just described above, the splitting roller can then be advanced at a more rapid feeding rate for penetrating the tool into the edge portion 12 of the blank to split the same. The feeding rate for the roller 10 during this splitting penetration can be at a rate considerably faster than the touch feed movement. Again, the penetrating feed movement can be reasonably varied and will depend to an appreciable extent upon the dimensions and characteristics of the blank and splitting tool, as well as on the value of the pressure being applied. For certain blanks a penetrating feed of approximately 35 inches per minute has been found satisfactory. The pressure for causing the roller 10 to penetrate the blank is applied through the shaft or arbor 54$^a$ thereof and is of a value suitable for the blank and for the rate of penetration desired.

During the splitting and forming operations performed on the blank 13, the workholder means 14 is driven and rotates the blank at a suitable speed which can be varied depending upon the size of the blank, characteristics of the metal thereof, the characteristics of the tools 10 and 11, and various other factors. The splitting roller 10 can be rotatably driven by appropriate power means, provided that it is not rotated at a faster speed than the blank 13. In the machine 16 the splitting roller 10 is rotated merely as the result of its engagement with the rotatably driven blank 13.

The relatively slow touch feed movement for the splitting roller 10 is needed when this roller is not separately driven because, in addition to the start of the penetration of the splitting edge portion 56 into the blank 13, the splitting roller must be accelerated during the touch engagement from a zero speed to the rotative speed at which the blank is being driven by the workholder means 14. This acceleration of the splitting tool 10 represents a drag applied thereby to the annular edge portion 12 of the blank and, if the drag effect is too severe, there is a possibility that tearing or other damage may be inflicted on the blank. The sequence described above for the different speeds of feeding movement is not essential and any desired rates and sequence of feeding movements can be employed, so long as they provide for a slow-feed touch engagement of the splitting roller with the edge portion of the blank which will permit acceleration of the splitting roller without damaging the blank.

Figure 8:
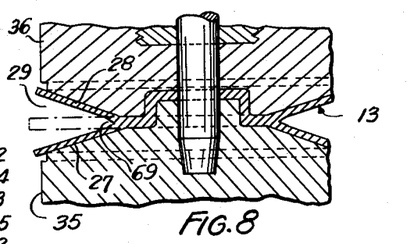
FIG. 8 is another such partial vertical axial section taken through the workholder means and showing the blank after the splitting thereof.

The penetration of the edge portion 56 of the roller 10 into the blank 13 splits the edge portion 12 of the latter peripherally therearound by dividing such edge portion into the two spaced or divergent walls 27 and 28, as shown in FIGS. 8 and 10. When the splitting roller 10 has been advanced toward the workholder means 14 for a feeding distance sufficient to cause the edge portion 56 to penetrate and split the blank for the desired depth, the wall portions 27 and 28 will be spread or deflected toward the bevel faces 43 and 44 of the workholder members 35 and 36 and will be pressed against these faces by the action of the sloping side walls 55$^a$ and 55$^b$ of the ridge portion 55.

The splitting of the edge portion 12 of the blank 13 and the spreading apart of the walls 27 and 28 results in the formation of the annular groove 29 which will have an included angle of approximately the same value as that desired in the completed wheel 25, namely the 37 degree included angle referred to above, but the bottom portion 69 of this groove will still have a sharp-V shape as shown in FIGS. 8 and 10 and corresponding with the sharp-V shape of the annular splitting edge portion 56 of the roller 10. At the completion of the splitting step performed by the roller 10, the outer or free annular edges of the divergent walls 27 and 28 will project beyond the inner edges of the annular notches 51 and 52 of the workholder members 35 and 36, as shown in FIG. 8.

Figure 9:
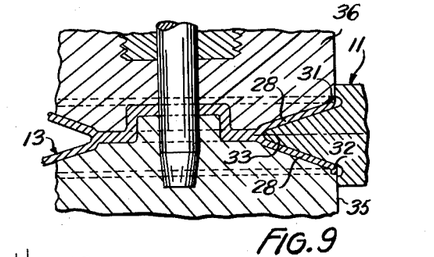
FIG. 9 is a similar partial vertical axial section but showing the split blank after the forming operation thereon, and also showing the co-operation of the bead-forming shoulders of the forming roller with the workholder means.

In shaping the split portion of the blank 13 to wheel-rim form, the forming roller 11 is advanced into operative engagement with such split portion as represented in FIG. 11 and results in a shaping, or reshaping, of the split portion to the condition illustrated in FIG. 9 and corresponding with the shape desired for the rim portion of the completed wheel 25.

As indicated in FIG. 11, the advance feeding movement of the forming roller 11 is preferably carried out with a rapid approach feed represented by the dimensional distance 70 and is then advanced into engagement with the split portion with a slower feeding rate to accomplish the forming operation on the blank. For the purpose of the forming operation by the roller 11, the split blank 13 is rotated by the workholder means 14. The roller 11 can, if desired, be individually driven but in the machine 16 is driven only by its engagement with the blank 13.

During the feeding movement of the forming roller 11, the ridge portion 60 thereof enters the groove 29 of the blank to thereby bring the side faces 60ª and 60ᵇ of the ridge portion into a smoothing and flattening engagement with the divergent walls 27 and 28. More important, however, is the co-operative engagement of the blunt edge 61 of the forming roller with and in the sharp-V bottom portion 69 of the groove which causes a widening and reshaping of this bottom portion into the transversely concave smoothly-filleted annular bottom portion 33 shown in FIGS. 9 and 11 and which is the desired finished shape and contour for the bottom of this groove in the completed wheel 25.

The feeding movement of the forming roller 11 also brings the bead-forming grooves 64 and 65 thereof into deflecting engagement with the free annular edges of the divergent walls 27 and 28 to form the same into the smooth annular beads 31 and 32 on the rim of the completed wheel 25.

The engagement of the forming roller 11 with the blank as described above is carried out by the use of a pressure of a suitable value applied to the forming roller through the support shaft or arbor 54ᵇ thereof to accomplish the forming or shaping of the split portion of the blank to the desired final wheel-rim form.

The machine 16 will now be described as representing one suitable form of apparatus for carrying out this invention. This machine is provided with a frame structure 73 which includes support legs or posts 74 and a table 75. The frame structure 73 also includes a bracket plate 76 supported at an elevated location above the table 75 by a group of tie rods 77, in this instance four such rods. The lower ends of the rods 77 are received in cups 78 and retained therein by connecting screws 79. The cups 78 are secured, as by welding, to block-like bracket means 80 which is suitably attached to the table 75.

The upper ends of the rods 77 extend through openings 81 of the bracket plate 76 and are threadedly engaged in cup-shaped nut members 82 which are secured to the upper side of the bracket plate by weld connections 83. The bracket plate 76 forms a support for a fluid pressure cylinder 85 which is operably connected with the clamping member 36 of the workholder means 14. The cylinder 85 is a double-acting cylinder, preferably hydraulic, having a piston 86 reciprocable therein and also having fluid supply and exhaust connections 88 at opposite ends thereof.

The power cylinder 85 is operably connected with the clamping member 36 of the workholder means 14 through a block or crosshead member 89 which is vertically slidable on the tie rods 77 by means of bushings or the like 90. The clamping member 36 is supported by the crosshead member 89 as by having the rod or stem 38 thereof rotatably mounted in antifriction bearings 91 and 92 provided in the crosshead member. A piston rod 93 connected with the piston 86 and projecting from the cylinder 85 extends through the bracket plate 76 and is attached to the crosshead member 89 by a threaded connection 94 and a lock nut 95.

The anvil member 35 of the workholder means 14 is connected with, and driven by, a spindle 97 which is rotatably supported in a mounting sleeve 98 as by means of suitable bearings 99 and 100. The mounting sleeve 98 is suitably supported by the table 75 and is attached thereto as by means of screws 101 extending through an attaching flange 102.

From the construction of the portions of the machine 16 which are associated with the workholder means 14, as just above described, it will be seen that the clamping member 36 can be moved by the cylinder device 85 in a clamping or releasing direction relative to the anvil member 35 for clamping or releasing a blank 13 and that, while such a blank is being held in the workholder means, it will be driven by torque supplied through the spindle 97 so that the edge portion 12 of the blank will rotate in its own plane. The rotatable mounting of the upper workholder spindle 38 in the crosshead member 89 permits the desired rotation of the workholder means and blank while the clamping pressure of the upper workholder member 36 is being maintained.

The machine 16 includes a suitable power device for supplying the driving torque to the lower workholder spindle 97, such as a variable speed electric motor 103, which is connected with a driving pulley 104 through a conventional speed control mechanism 105 and a conventional clutch and brake unit 106. The motor 103 is suitably mounted on the frame structure 73 by an upright support plate 107 whose connection with the frame structure includes a pair of angle brackets 108. The clutch and brake unit 106 includes an output shaft 109 having the drive pulley 104 secured thereto, and the speed control mechanism 105 includes a manually operable control member or handle 110 for varying the speed at which the output shaft is driven. A pulley 111 is secured to the lower end of the workholder spindle 97 and is driven from the pulley 104 by a belt 112 extending therearound.

The machine 16 is provided with supporting and actuating means for supporting and shifting the splitting roller 10, and is also provided with a similar supporting and actuating means for the forming roller 11. Since the supporting and actuating means is the same for both of these rollers, the supporting and actuating means need be described in detail only for the splitting roller 10.

This supporting and actuating means includes a carrier 115 here shown in the form of a plate shiftable on the table 75, a first support member 116 here shown in the form of a block connected with the carrier 115, and a second support member or guideway member 117 supporting a slide 118 on which the roller 10 is rotatably mounted. The guideway member 117 is here shown as comprising a base plate 119 having undercut parallel side rail portions 120 (see FIG. 6) defining a guideway 121 which extends in a direction transverse to the rotation axis 37 of the workholder means 14. The base plate 119 is attached to the support member 116 by pairs of connecting and clamping screws 113 and 114 and by laterally projecting pivot pins or trunnions 122 and 123 which are rotatable in laterally aligned bearings provided by hollow bracket portions 124 and 125 of the support member.

For a purpose to be presently explained the base plate 119, including the slide 118, is swingable to a limited extent in a vertical direction and about the axis of the pivot pins 122 and 123 as by means of an adjusting shaft 127 which is rockable in laterally aligned hollow bearing portions 128 and 129 of the support member 116. The adjusting shaft 127 includes an eccentric intermediate portion 130 in co-operative engagement with a hardened insert bearing plate 131 of the base plate 119. The shaft 127 is provided with noncircular end sockets 127a for the application of a suitable actuating tool or handle thereto.

Figure 4:
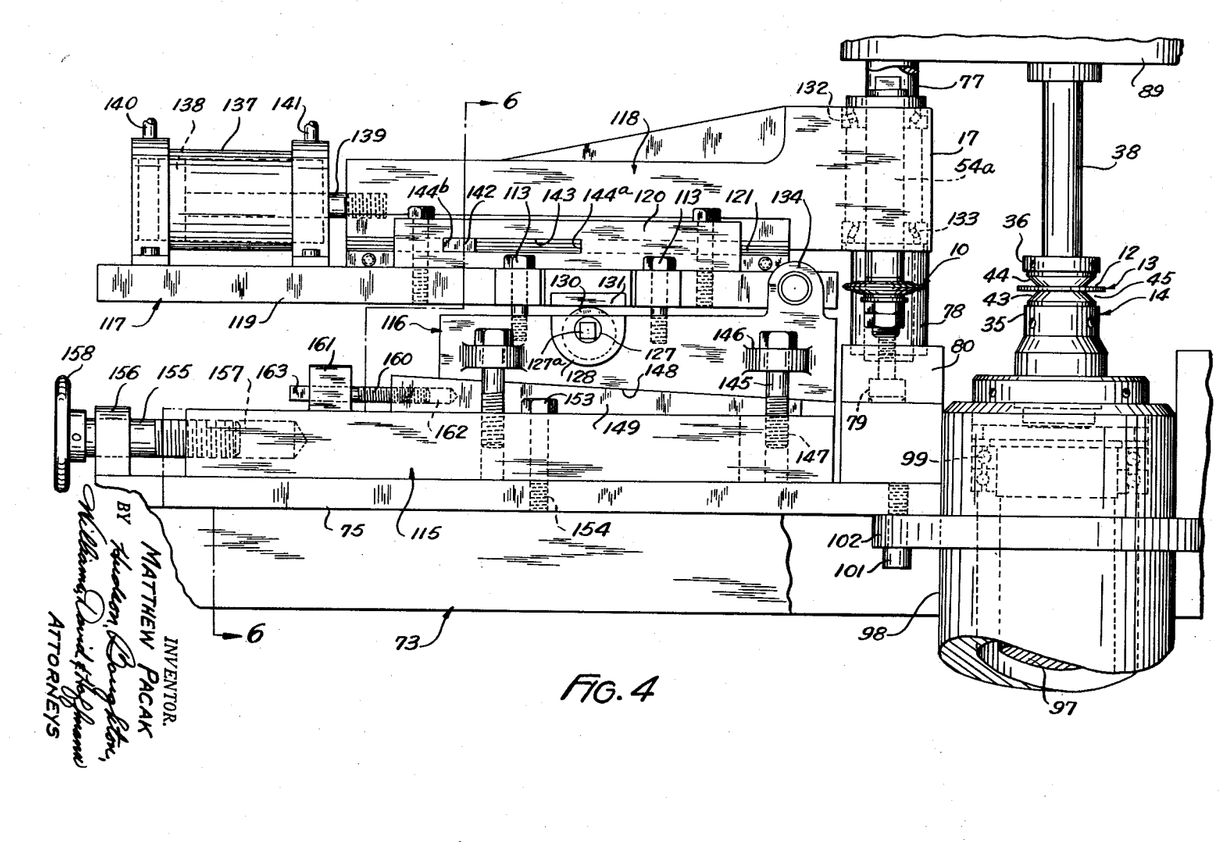
FIG. 4 is a partial front elevation corresponding with the portion of FIG. 1 which includes the supporting and actuating means for the splitting tool, but showing such portion on a larger scale.
Figure 5:
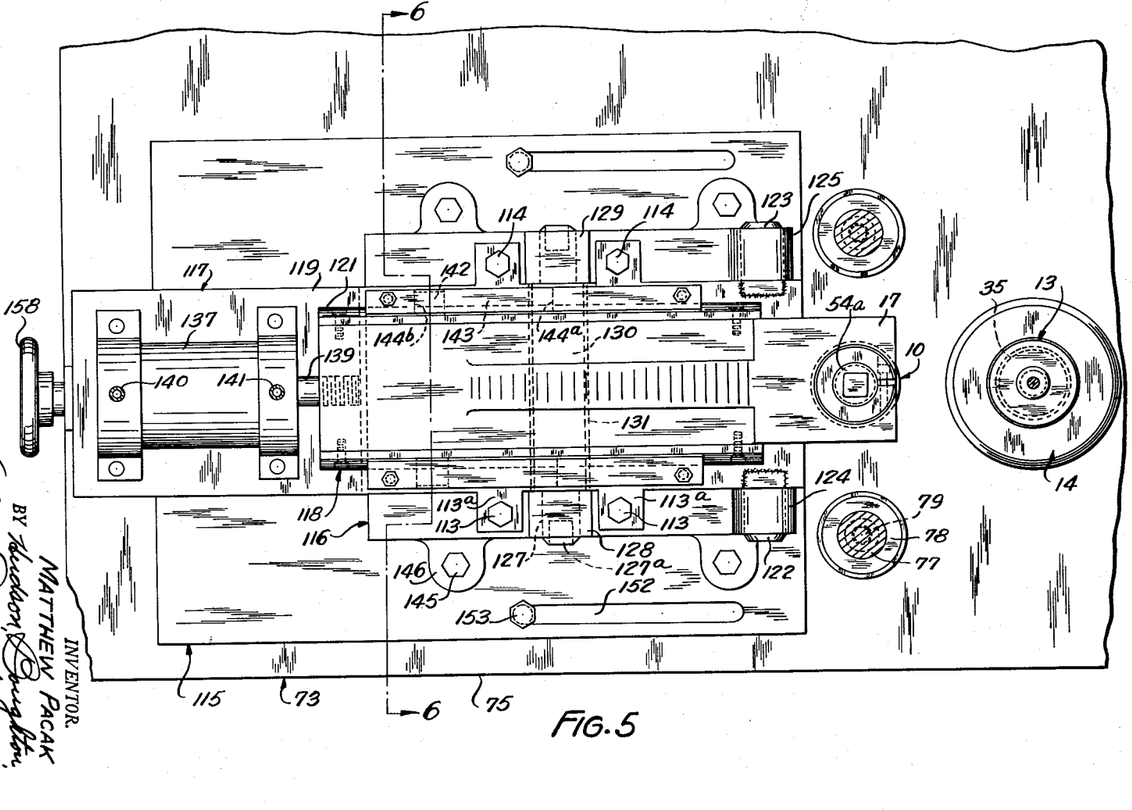
FIG. 5 is a plan view of the portion of the apparatus shown in FIG. 4 and employing such larger scale.

The pairs of connecting and clamping screws 113 and 114 are located on opposite sides of the adjusting shaft 127 as shown in FIGS. 4 and 5. These screws extend through laterally projecting lugs 113a and 114a of the base plate 119 and have threaded connections with the support member 116.

The slide 118 includes the above-mentioned tool support head 17 at the forward or inner end thereof in which the tool spindle 54 is rotatably mounted by means of suitable bearings 132 and 133. The rear portion of the slide 118 operates in the guideway 121 and, for this purpose, is provided with dovetail-shaped follower members or portions 134 which engage under and slidably co-operate with the side rail members 120 of the base plate 119.

The splitting roller 10 is movable toward and away from the blank 13, in this case by reciprocable movement applied to the slide 118 by a suitable power device which is here shown in the form of a fluid pressure cylinder 137 mounted on the base plate 119. The cylinder 137 is a double-acting cylinder, preferably hydraulic, having a piston 138 connected with the rear end of the slide 118 by a piston rod 139 and is provided with fluid pressure supply and exhaust connections 140 and 141 at opposite ends thereof. Any valve means of a suitable type, such as a conventional manually operable valve means, may be used to control the supply and exhaust connections 140 and 141 of the cylinder 137.

Figure 2:
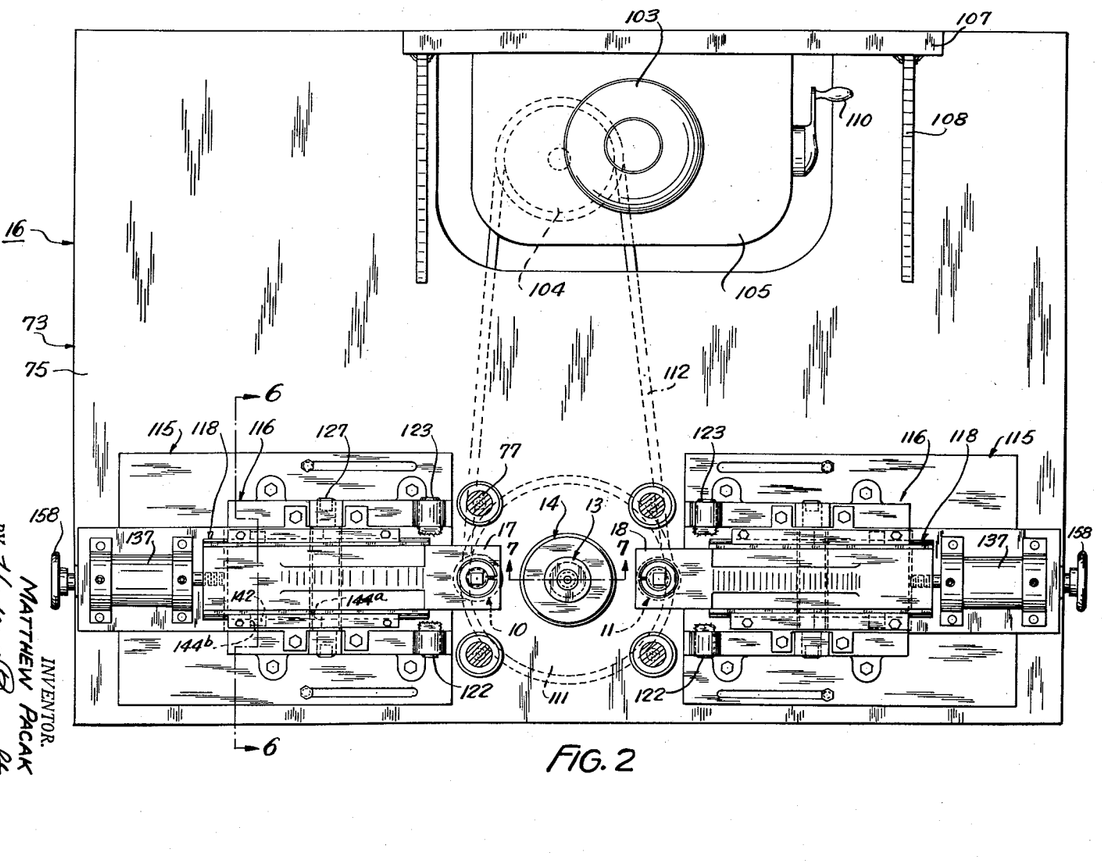
FIG. 2 is a sectional plan view of the apparatus taken on section line 2—2 of FIG. 1.
Figures 3, 6:
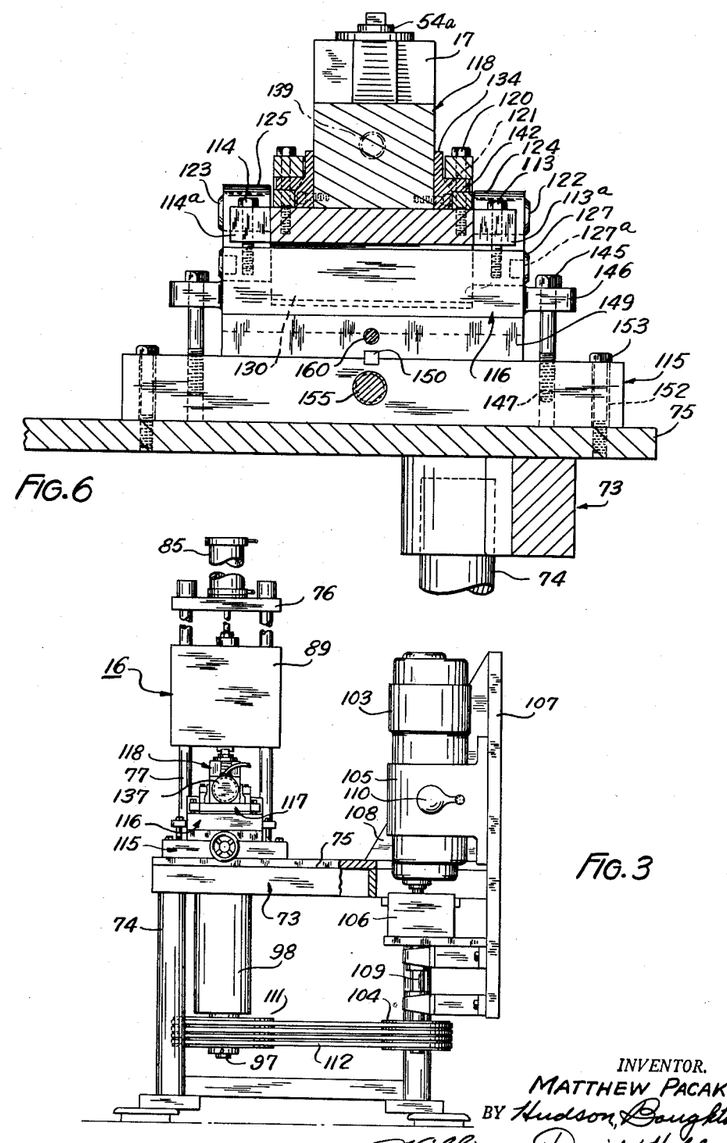
FIG. 3 is a side elevation of the apparatus with portions of the frame structure and table broken away.
FIG. 6 is a partial transverse vertical section taken on section line 6—6 of FIGS. 1, 2, 4 and 5.

Stop means is provided for limiting the inward feeding movement of the slide 118 when the splitting roller 10 has penetrated the blank 13 to the desired extent explained above in connection with the formation of the divergent walls 27 and 28. Such a stop means is shown in FIGS. 2 and 6 as comprising stop lugs 142 projecting laterally from the follower members 121 and movable in slots 143 of the side rail members 120. Abutment shoulders 144a and 144b at the ends of the slots 143 are engageable by the stop lugs 142 and thus limit the inward feeding and outward retracting movements of the slide 118 and the splitting roller 10 carried thereby.

The support member 116 is connected with the carrier 115 as by a group of connecting and clamping screws 145 which extend through laterally projecting ears 146 of the support member and are threadedly engaged in openings 147 of the carrier. The lower face 148 of the support member 116 is an inclined face and co-operates with a wedge member 149 which is interposed between the support member and the carrier 115.

The wedge member 149 is an adjusting member whose purpose will be presently explained and is slidable on the upper surface of the carrier 115. This wedge member is operatively maintained in a position for back and forth adjusting movement as by means of a key 150 or the like (see FIG. 6) located in coextending mating keyways provided in the adjacent faces of the carrier 115 and the wedge member 149.

The carrier 115 is suitably guided for a back and forth slidable adjusting movement on the table 75 as by means of guide slots 152 provided in the carrier adjacent the side edges thereof and guiding and clamping screws 153 extending through these slots and having threaded connections 154 with the table.

The in and out slidable adjusting movement of the carrier 115 toward and away from the workholder means 14 is provided for the purpose of adjusting the position of the splitting roller 10 relative to the workholder means so as to adapt the machine 16 to operate on blanks of different sizes. The in and out adjusting movement of the carrier 115 thus serves to establish a setting of the splitting tool 10 relative to the workholder means 14 which will be appropriate for a blank 13 of a given size and which will be suitable for the feeding and return movements to be imparted to the splitting tool by the operation of the power cylinder 137.

The in and out adjusting movements of the carrier 115 are imparted thereto by a suitable adjusting means which is here shown as comprising an adjusting screw 155 rotatable in, and held against axial shifting by, a bearing bracket 156 of the table 75. The inner end of the screw 155 is engaged in a threaded opening 157 of the carrier 115 and is provided at its outer end with a hand wheel or the like 158 for imparting the rotative adjusting movement to the screw. The guide and clamping screws 153 are, of course, loosened when an adjustment of the carrier 115 is to be made and are suitably tightened thereafter to retain the carrier in a clamped engagement with the table 75.

As has been mentioned above, the operative position of the splitting roller 10 is with the annular edge portion 56 thereof lying in and centered on the mid-plane of the edge portion 12 of the blank 13, that is, with the knife-edge 57 of the splitting edge portion lying directly opposite the mid-point of the axial length of the edge face 23. The wedge member 149 provides for adjustment of the support member 116 and the slide 118 in a vertical direction, that is, in a direction parallel to the rotation axis 37 of the workholder means 14 for achieving this coplanar operative location for the knife-edge 57 relative to the mid-plane of the blank 13.

Figure 1:
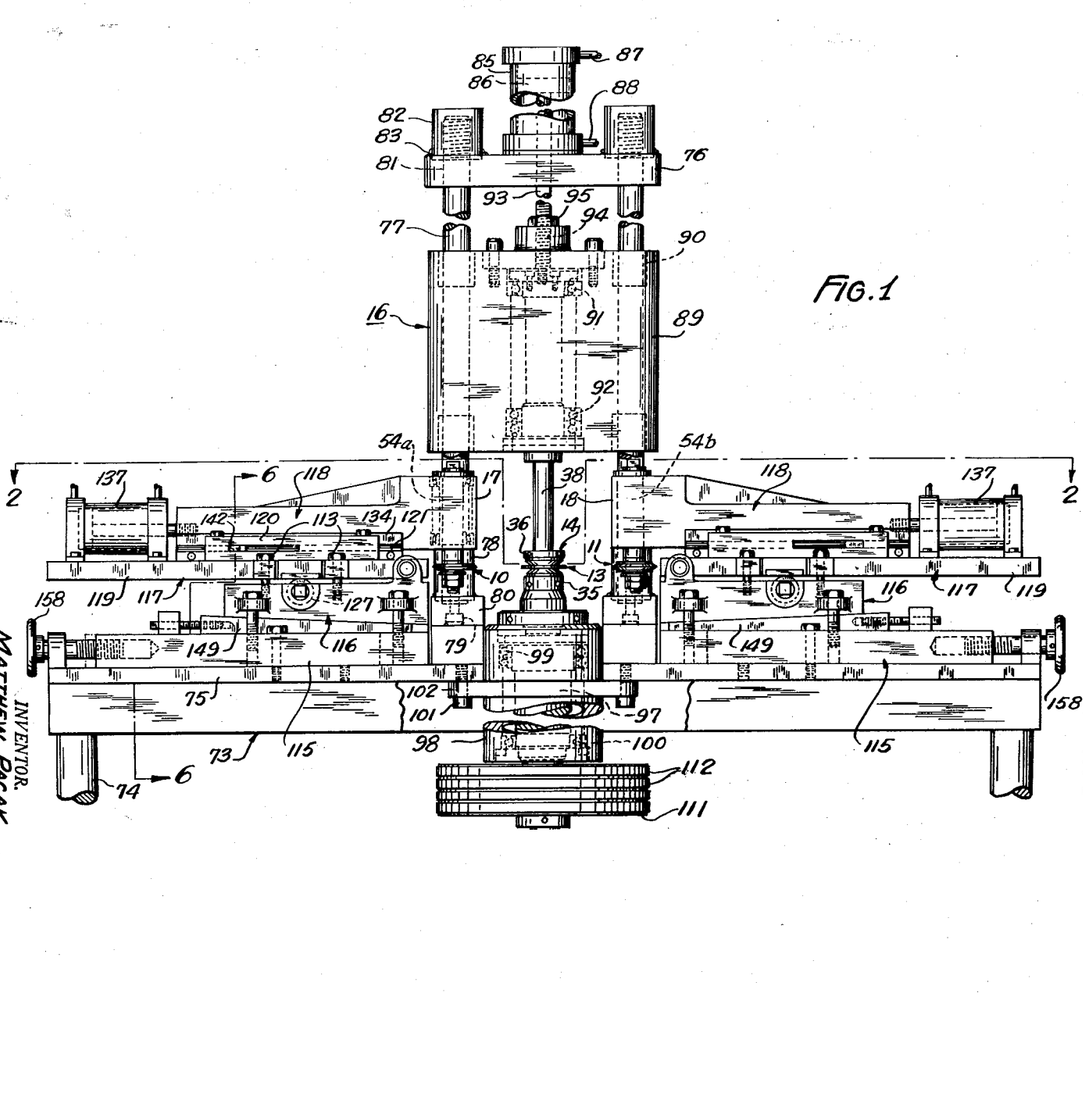
FIG. 1 is a front elevation showing grooved wheel making apparatus provided by this invention.

As is apparent from the construction and arrangement shown in FIGS. 1 and 4, an inward adjusting movement of the wedge 149 will cause the splitting roller 10 to be lifted, and an outward adjusting movement of the wedge will cause the splitting roller to be lowered. These in and out adjusting movements are imparted to the wedge member 149 by suitable adjusting means which is here shown as comprising an adjusting screw 160 which is rotatable in, and held against axial shifting by, a bearing bracket 161 provided on the carrier 115. The inner end of the screw 160 is engaged in a threaded opening 162 of the wedge member and the outer end of the screw is provided with a non-circular portion 163 for the application of a suitable tool to the screw.

When a vertical adjustment of the splitting roller 10 is to be made by a shifting of the wedge member 149 in the manner explained just above, the connecting and clamping screws 145 for the support members 116 are in a loosened condition. When the vertical adjustment of the splitting roller 10 has been thus accomplished, the screws 145 are retightened to maintain the splitting roller in the vertically adjusted position by tightly clamping the support member 116 and the wedge member 149 against the carrier 115.

To accomplish a proper splitting of the edge portion of the blank 13 it is important that the edge portion 56 and the knife-edge 57 of the roller 10 lie in a coplanar relation with the mid-plane of the blank, as mentioned above. A proper splitting action will not be accomplished, however, if the splitting roller 10 happens to be in an inclined or cocked position relative to the mid-plane of the blank 13. The swinging movement of the guideway member 117, provided for by the above-mentioned pivot pins 122 and 123 and the above-mentioned adjusting shaft 127, is a swinging movement in a vertical direction or arc by which any such angular or cocked position of the splitting roller 10 relative to the mid-plane of the blank 13 can be corrected. This is accomplished by rotating the adjusting shaft 127 to the extent necessary to swing the guideway member 117 up or down about the axis of the pivot pins 122 and 123 to thereby bring the annular edge portion 56 and the knife-edge 57 of the splitting roller into an exact coincident or coplanar relation to the mid-plane of the blank.

When this aligning adjustment of the splitting roller is to be made in the manner just above described the screws 113 and 114 are loosened and, when the adjustment has been made, these screws are retightened whereby the guideway member 117 and the splitting roller 10 are maintained in the established position of adjustment.

Since the supporting and actuating means for the forming roller 11 is the same as for the splitting roller 10, as mentioned above, it will be understood that the forming roller is susceptible of the same adjustments and is actuated in substantially the same manner as the splitting roller. The same reference numerals have accordingly been applied to the same corresponding parts of the supporting and adjusting means for the forming roller.

With respect to the adjustments thus provided for locating the splitting and forming rollers 10 and 11 relative to the workholder means it will be understood, of course, that when these adjustments have been made for a particular workpiece or blank 13, the machine 16 will then be in an adjusted or calibrated condition and the splitting and forming of the blanks can be carried out in rapid succession merely by operating the machine to clamp or release the blanks and to actuate the rollers to their blank-engaging and retracted positions by means of the power cylinders 137.

From the accompanying drawings and the foregoing detailed description it will now be readily understood that this invention provides novel apparatus for rapidly and economically producing annularly grooved wheels by a blank splitting and forming procedure involving the pressure application of tool means to the annular edge of a blank being rotatably driven. It will also be seen that when the tool means comprises a sharp-edged splitting roller and a blunt-edge forming roller, such rollers can be operatively engaged with the blank in succession while the blank is being held and rotated by the workholder means. The use of the sharp-edged splitting tool makes possible a rapid splitting of the edge portion of the blank and the use of the blunt-edged forming tool makes possible a rapid forming or reshaping of the split portion of the blank to the shape desired for the rim portion of the completed wheel.

Although the wheel making apparatus of this invention has been illustrated and described herein to a somewhat detailed extent, it will be understood, of course, that the invention is not to be regarded as being correspondingly limited in scope but includes all changes and modifications coming within the terms of the claims hereof.

Having described my invention, I claim:

1. In apparatus for making grooved wheels, a frame structure, a rotatable workholder means mounted on said structure and adapted to hold a metal blank having a flat annular peripheral portion, means for driving said workholder means for rotating said flat annular peripheral portion in its own plane, a carrier shiftable along a path on said frame structure in directions toward and away from said workholder means and in a plane extending transverse to the rotation axis of the latter, support means on said carrier and adjustably movable relative thereto in a direction transverse to said path and substantially perpendicular to said plane, guide means providing a guideway extending in a direction transverse to the rotation axis of said workholder means, a slide operable in said guideway, tool means rotatably supported by said slide and having a convergent annular ridge portion co-operable with said peripheral portion for forming the same into an annularly grooved wheel rim, a power device operable with a predetermined power stroke and connected with said slide for actuating the latter to operably engage said tool means with said peripheral portion, said support means having said guide means thereon and providing a common mount for said power device and slide, adjusting means effective on said carrier to shift the same along said path to a predetermined position appropriate for the engagement of said tool means with the blank by the predetermined power stroke operation of said power device, and other adjusting means effective on said support means for shifting the same in said transverse perpendicular direction to locate said annular ridge portion directly opposite the mid-point of the axial thickness of said peripheral portion.

2. Apparatus as defined in claim 1 wherein said support means comprises first and second support members of which said first support member is connected with said carrier and said second support member forms said common mount, pivot means connecting said second support member with said first support member for swinging relative to the latter, and wherein a third adjusting means is effective on said second support member for swinging the same to a predetermined position of coplanar alignment for said annular ridge portion of said tool means with the midplane of said peripheral portion.

3. Apparatus as defined in claim 1 wherein said support means comprises first and second support members of which said first support member is connected with said carrier and said second support member forms said common mount, and wherein said other adjusting means comprises shiftable wedge means interposed between said first support member and said carrier.

4. Apparatus as defined in claim 1 wherein said support means comprises first and second support members of which said first support member is connected with said carrier and said second support member forms said common mount, pivot means connecting said second support member with said first support member for swinging relative to the latter, and wherein a third adjusting means comprising rotatable eccentric means is interposed between said first support member and said second support member for causing the swinging of the latter.

5. In apparatus for making grooved wheels; a frame structure; rotatable workholder means on said structure and adapted to hold a metal blank having a web portion terminating in a flat annular peripheral portion; means for driving said workholder means for rotating said peripheral portion in its own plane; a carrier shiftable on said structure for a first adjusting movement toward and away from said workholder means in a first plane extending in a transverse substantially perpendicular relation to the rotation axis of the workholder means; first and second support members in a superposed relation on said carrier; a first connecting means connecting said first support member with said carrier; a second connecting means connecting said second support member with said first support member; guideway means providing a guideway lying substantially in a second plane extending transverse to said rotation axis; slide means operable in said guideway for actuating movement toward and away from said workholder means; tool means rotatably supported by said slide means and having a convergent annular ridge portion engageable with said peripheral portion for forming the same into an annularly grooved wheel rim; a power device connected with said slide means for imparting the actuating movement thereto and having a predetermined work stroke; one of said support members providing a common mount having said guideway means and power device mounted thereon; a first adjusting means effective on said carrier for imparting said first adjusting movement thereto in an amount appropriate for the diameter of said peripheral portion and for the work stroke of said power device; a second adjusting means associated with the connecting means of one of said support members comprising wedge means effective on the last-mentioned one support member for imparting thereto a second adjusting movement in a direction substantially perpendicular to said first plane and along said axis for locating said annular ridge portion at substantially the same elevation as said peripheral portion; and a third adjusting means associated with the connecting means of the other support member comprising spaced cam and pivot members effective on said other support member for swinging thereof in a direction transverse to said first plane for positioning said annular ridge portion in a coplanar relation to said peripheral portion.

6. Apparatus as defined in claim 5 wherein said wedge means is located between said first support member and said carrier, and said cam and pivot members are located between said first and second support members.

7. Apparatus as defined in claim 5 wherein said first and second support members comprise lower and upper support members respectively; said guideway means and power device being located on said upper support member.

References Cited in the file of this patent

UNITED STATES PATENTS

| | | | |
|---|---|---|---|
| 518,766 | Plecker | Apr. 24, | 1894 |
| 901,667 | Wrigley | Oct. 20, | 1908 |
| 1,494,409 | Bidle | May 20, | 1924 |
| 1,555,771 | Stenz | Sept. 29, | 1925 |
| 1,828,464 | Harrison | Oct. 20, | 1931 |
| 1,896,426 | Schmidt | Feb. 7, | 1933 |
| 2,157,252 | Visser et al. | May 9, | 1939 |
| 2,373,907 | Olson | Apr. 17, | 1945 |
| 2,421,011 | Chevigny | May 27, | 1947 |
| 2,627,196 | Marsilius | Feb. 3, | 1953 |
| 2,763,168 | Kendall | Sept. 18, | 1956 |
| 2,857,789 | Robinson | Oct. 28, | 1958 |